(12) United States Patent
You et al.

(10) Patent No.: US 11,396,972 B1
(45) Date of Patent: Jul. 26, 2022

(54) DISPLAY MOUNT WITH DECORATIVE LIGHTING

(71) Applicant: NINGBO TUOTUO RIVER DESIGN COMPANY, Zhejiang (CN)

(72) Inventors: Xiaodong You, Ningbo (CN); Zhimin Wang, Ningbo (CN); Jie Yang, Ningbo (CN)

(73) Assignee: NINGBO TUOTUO RIVER DESIGN COMPANY, Zhejiang (CN)

( * ) Notice: Subject to any disclaimer, the term of this patent is extended or adjusted under 35 U.S.C. 154(b) by 0 days.

(21) Appl. No.: 17/197,913

(22) Filed: Mar. 10, 2021

(51) Int. Cl.
| | | |
|---|---|---|
| *F16M 11/20* | (2006.01) | |
| *F21V 23/04* | (2006.01) | |
| *G06F 1/16* | (2006.01) | |
| *F16M 11/04* | (2006.01) | |
| *F21W 121/00* | (2006.01) | |
| *F21Y 103/10* | (2016.01) | |
| *F21Y 115/10* | (2016.01) | |

(52) U.S. Cl.
CPC ....... *F16M 11/2064* (2013.01); *F16M 11/046* (2013.01); *F21V 23/04* (2013.01); *G06F 1/1601* (2013.01); *F16M 2200/00* (2013.01); *F21W 2121/00* (2013.01); *F21Y 2103/10* (2016.08); *F21Y 2115/10* (2016.08)

(58) Field of Classification Search
CPC ............ F16M 11/2064; F16M 11/046; F16M 2200/00; F21V 23/04; G06F 1/1601; F21Y 2103/10; F21Y 2115/10; F21W 2121/00
USPC ......................................................... 362/234
See application file for complete search history.

(56) References Cited

U.S. PATENT DOCUMENTS

| | | | |
|---|---|---|---|
| 2012/0325985 A1* | 12/2012 | Slowinski | F16M 13/02 248/121 |
| 2018/0360216 A1* | 12/2018 | Loether | F16M 13/027 |

* cited by examiner

*Primary Examiner* — Rajarshi Chakraborty
*Assistant Examiner* — Hana S Featherly
(74) *Attorney, Agent, or Firm* — Knobbe Martens Olson & Bear LLP

(57) ABSTRACT

The utility model relates to a display mounting structure with decorative lighting, the mounting structure comprises a support component, a mounting component and a light source. The mounting component is used to connect the mounting object, the support component is connected with the mounting component, and the light source located on the support structure enables the support structure to produce the atmospheric effect. The utility model display mounting structure with decorative lighting comprises a light source having a plurality of light emitting elements, providing the atmospheric effect and improving the integral usage experience of the product.

13 Claims, 11 Drawing Sheets

US 11,396,972 B1

DISPLAY MOUNT WITH DECORATIVE LIGHTING

BACKGROUND

This application relates to structural mounts and mounting systems for supporting displays, such as televisions, computer monitors, and others, and in particular, to a display system that includes decorative lighting.

SUMMARY

Presently, existing display mount systems configured to support displays, such as televisions, computer monitors, and others, have functionality that is limited to supporting the display relative to a flat surface such as a wall or table. Such existing display mount systems generally lack any decorative features, such as decorative lighting. For example, existing display mount systems do not provide any functionality related to atmosphere or decoration and thus do not improve the overall experience of using the systems.

A display mount with decorative lighting is described in this application. The display mount with decorative lighting can be configured to meet the aforementioned technological needs, including providing decorative lighting, atmospheric decoration, ambience, etc., while simultaneously performing functionality relating to supporting a display. The display mounts with decorative lighting described herein can provide an improved usage experience relative to existing display mount systems. To this end, the display mounts with decorative lighting described herein can include one or more of the following features described in this summary section as well as other features described throughout the application. This summary section is provided as an introduction the concepts described throughout this application and is not intended to be limiting.

In one aspect, the display mount with decorative lighting can comprise a support component, a mounting component, and light source. The mounting component and the support component can be configured to connect to a display and support the display relative to a surface, such as a wall or table. The light source can be disposed on the display mount (e.g., on the support component or the mounting component) and can be configured to produce an atmospheric effect, such as ambient lighting, for example.

In some embodiments, the support component comprises a column and a base. The base can be attached to the column, and the lighting source can be integrated into or attached to the column and/or the base.

In some embodiments, the column has a front side a and a rear side, with the front side being opposite to the rear front side. The light source can include at least one first light emitting element and/or at least one second light emitting element. The at least one first light emitting element can be disposed on the front side, and the at least one second light emitting element can be disposed on the rear side.

In some embodiments, the base comprises a first support bar and a second support bar, with a first end of the second support bar connecting with the first support bar so as to define a T-shape base. A second end of the second support bar can connect with the column. The light source can include at least one third light emitting element and/or at least one fourth light emitting element. The at least one third light emitting element can be disposed on the first support bar, and the at least one fourth light emitting element can be disposed on the second support bar.

In some embodiments, the light source includes at least one fifth light emitting element. The at least one fifth light emitting element can be disposed on the mounting component.

In some embodiments, the light source includes a control switch used for controlling the light source (e.g., any of the light emitting elements). The control switch can be disposed on the second support bar, for example, as well as in other locations.

In some embodiments, the light emitting elements of light source comprise one or more lighting strips and/or LED lights.

In some embodiments, an adjustment mechanism is disposed between the support component and the mounting component. The adjustment mechanism can be configured to adjust a swivel, tilt and/or height of a display supported by the display mount.

Accordingly, the display mounts with decorative lighting described herein can comprise one or more light source(s) with a plurality light emitting elements configured to provide an atmospheric effect, such as decorative or ambient lighting, and improve the integral usage experience of the display mount by providing additional functionality not provided by existing display mounts.

BRIEF DESCRIPTION OF THE DRAWINGS

The features and advantages of the display mounts with decorative lighting and associated methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

FIG. 4 is a first perspective view thereof;
FIG. 5 is a second perspective view thereof;
FIG. 6 is a front view thereof;
FIG. 7 is a back view thereof;
FIG. 8 is a left side view thereof;
FIG. 9 is a right side view thereof;
FIG. 10 is a top view thereof; and
FIG. 11 is a bottom view thereof.

DETAILED DESCRIPTION

As noted above, this application provides a display mount with decorative lighting. The display mount can be configured to provide support for an attached display, such a television, computer monitor or other. In some embodiments, the display mount can be attached to the display and configured to affix or otherwise support the display relative to surface, such as a wall or table. As a first example, a display can be attached to the display mount and the display mount can be can be configured support the display relative to a table on which the display mount is placed. As another example, a display can be attached to the display mount and the display mount can be attached to a wall to support the display relative to the wall. Further, the display mount includes at least one light source or lighting element. The light source can be configured to provide lighting, such as decorative, ambient, or other types of lighting that can improve the usage experience of the display mount.

A preferred embodiment of a display mount with decorative lighting will be described hereinafter with reference to FIGS. 1-3. FIGS. 4-11 provide additional views of an embodiment of a display mount with decorative lighting.

Figure 1:
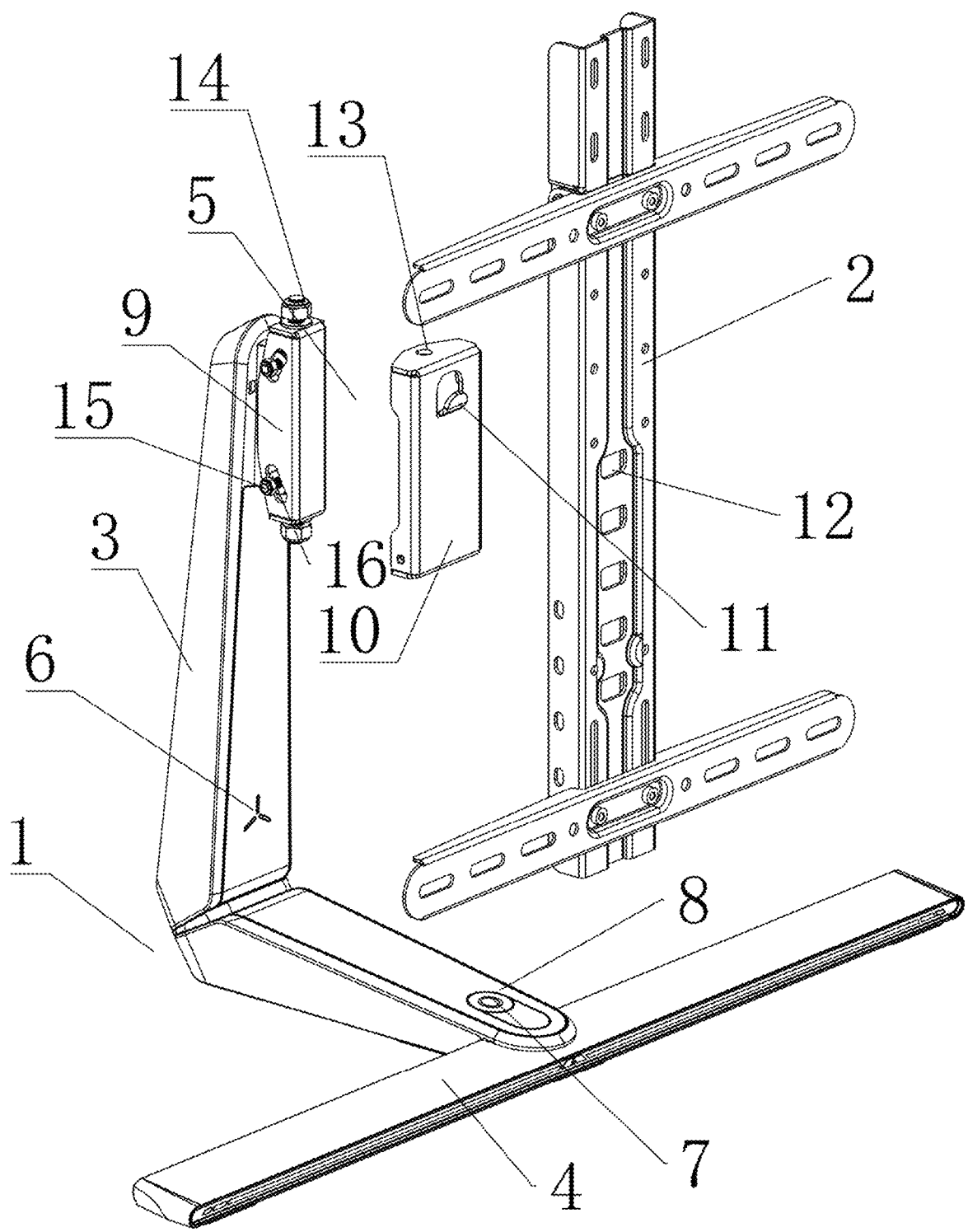
FIG. 1 is a first exploded perspective view illustrating an embodiment of a display mount with decorative lighting.

FIG. 1 is a first exploded perspective view illustrating a generally front view of the display mount with decorative lighting. FIG. 2 is a rear view of the display mount with decorative lighting. FIG. 3 is a second exploded perspective view of the display mount with decorative lighting. As shown in FIGS. 1-3, the display mount with decorative lighting comprises a support component 1, a mounting component 2, and light source (as will be described more specifically below). The mounting component 1 can be adapted to connect to a display. For example, in the illustrated embodiment, the support component 1 can be connected to the mounting component 2, which can be configured in size and shape to allow a display to be connected thereto. A light source disposed on the support component 1 can enable the support component 1 to produce an atmospheric lighting effect.

In the illustrated embodiment, the support component 1 comprises a column 3 and a base 4. The baes 4 can be connected (either integrally or attachably) to the base 3. In some embodiments, one or both of the column 3 and the base 4 can include a light source configured to produce decorative lighting. In some embodiments, for example, as illustrated, the base 4 can be configured in size and shape to support the display mount and display relative to a generally horizontal surface such as a table or a television cabinet. Accordingly, during use of the display mount, in some embodiments, the base 4 rests on a horizontal surface and the column 3 extends upwardly therefrom.

Figure 2:
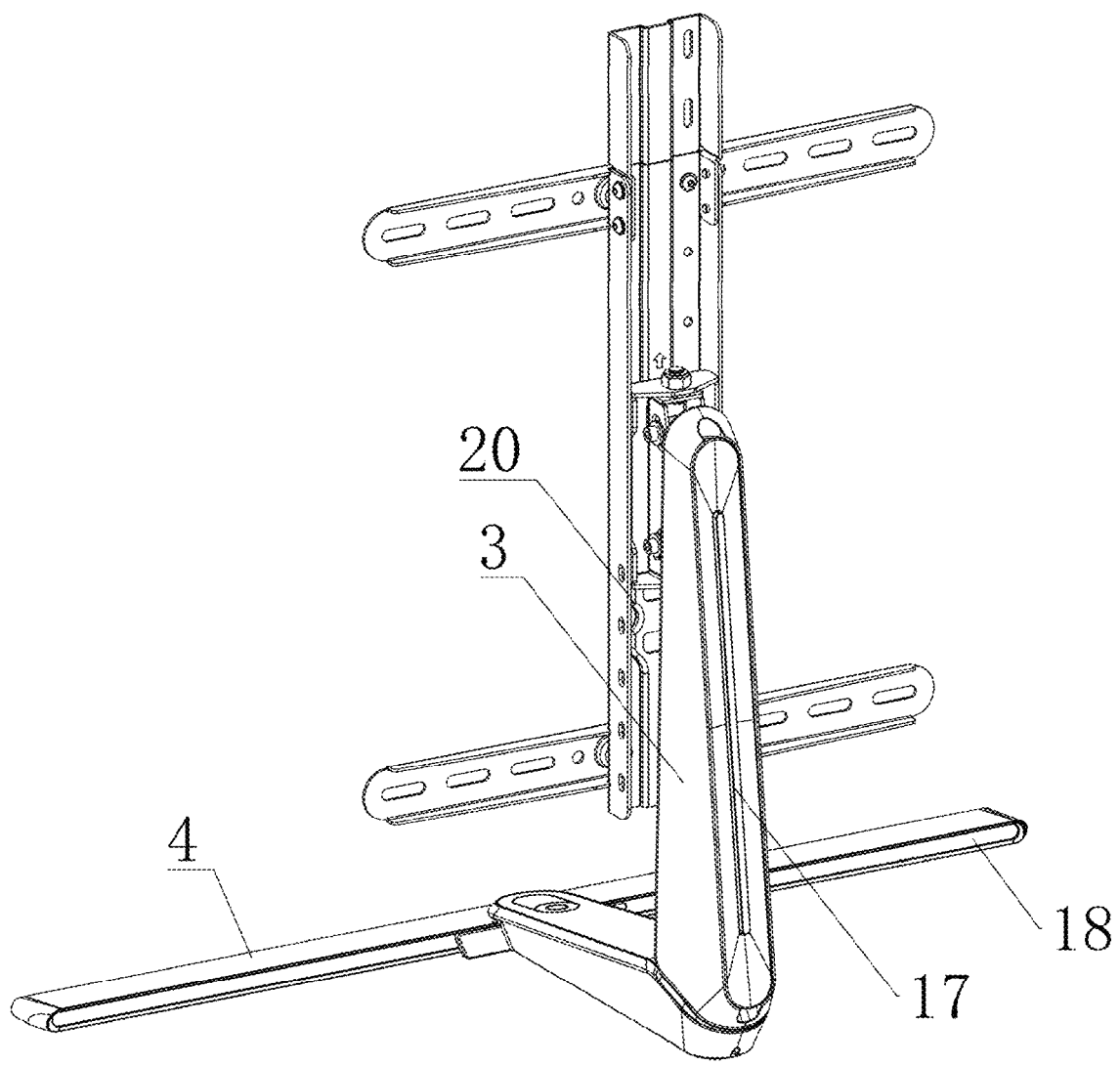
FIG. 2 is a rear view of the display mount with decorative lighting of FIG. 1.

In the illustrated embodiment, the column 3 comprises a front side (see FIGS. 1 and 3) and a rear side opposite to the front side (see FIG. 2). In the illustrated embodiment, the light source can include a first light emitting element 6 (FIG. 1) and a second light emitting element 17 (FIG. 2). The first light emitting element 6 can be disposed on the front side, and the second light emitting element 17 can be disposed on the rear side.

In the illustrated embodiment, the base 4 includes a first support bar and a second support bar, the first end of the second support bar connecting with the first support bar so as to define a general T-shape for the base 4. The second end of the second support bar can connect or be attached to the column 3. In the illustrated embodiment, the light source includes a third light emitting element 18 (FIG. 2) and a fourth light emitting element 8 (FIG. 1). The third light emitting element 18 can be disposed on the rear side of the first support bar and the fourth light emitting element 8 disposed on the second support bar.

In addition, in the illustrated embodiment, the mounting component 2 is provided with at least one fifth light emitting element 20, as shown in FIG. 2). The at least one fifth light emitting element 20 can be positioned on the rear side of the mounting component 2.

The fourth light emitting element 8 can comprise one or more LED lights (e.g., in the form of lamp beads, such as an individual or plurality of individual LEDs). The LED lights can be, in some embodiments, configured to illuminate with preset patterns or colors. In some embodiments, the first light emitting element 6, the second light emitting element 17, the third light emitting element 18, and the fifth light emitting element 20 form one or more lighting tapes (e.g., in the form of lamp strips, such as strips of LEDs). In some embodiments, the second light emitting element 17 can extend in an axial direction on the column 3, and the third light emitting element 18 can extend in an axial direction on the first support bar.

As illustrated in FIG. 2, in some embodiments, one or more light slots can be disposed on the rear side of the column 3 and the first support bar for receiving corresponding light emitting elements. The light emitting elements may comprise other forms, such as other types of light emitting elements, including non-LED lights. Moreover, not all of the illustrated light emitting elements need be provided in all embodiments, and one or more of the illustrated light emitting elements can be provided in different locations in other embodiments.

As shown in FIG. 1, the display mount can comprise comprises a control switch 7. The control switch 7 can be configured for controlling the light emitting elements, for example, to turn on or off the light-emitting. In the illustrated embodiment, the control switch 7 is disposed on the second support bar, although other locations for the control switch 7 are also possible.

Figure 3:
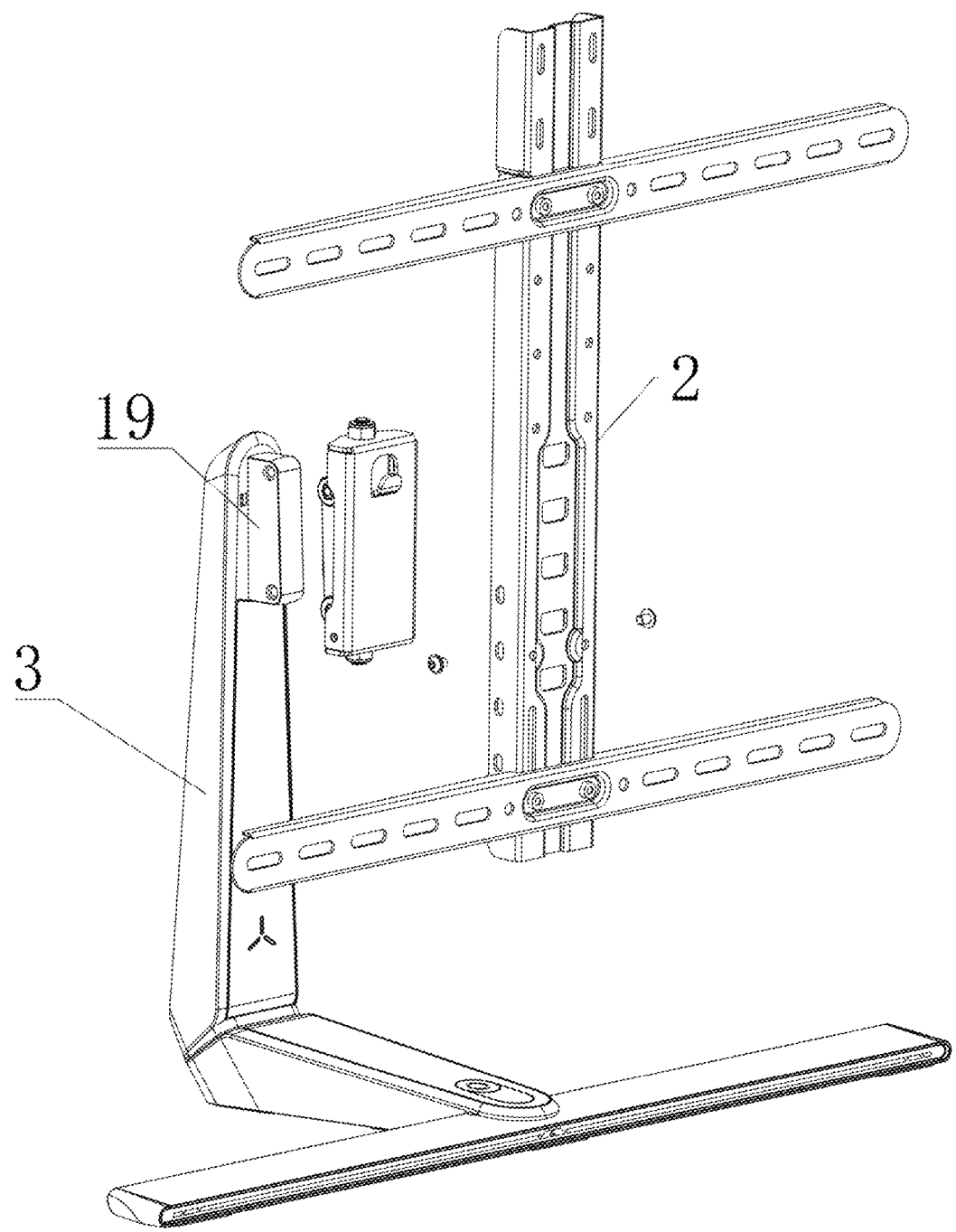
FIG. 3 is a second exploded perspective view illustrating an embodiment of a display mount with decorative lighting.

As shown in FIG. 1, FIG. 2 and FIG. 3, the display mount can also include adjustment mechanism 5 disposed between the support component 1 and the mounting component 2. The adjustment mechanism 5 can be configured to adjust the swivel, tilt and/or height of the display mounted to the mounting component 2. The illustrated embodiment provides one example of an adjustment mechanism 5, with the understanding the other mechanisms or structures can also be used. In some embodiments, no adjustment mechanism 5 need be included such that the mounting component 2 is fixedly positioned relative to the support component 1.

As shown in the illustrated embodiment of FIGS. 1-3, the adjustment mechanism 5 comprises a first connector 10, a second connector 9 and a fixture 19 (FIG. 3), wherein the fixture 19 is fixedly connected with the upper part of the column 3, and the first connector 10 is connected with the fixture 19 through the second connector 9. Adjusting holes 13 can be disposed on the top and bottom of the first connector 10, and adjusting holes 13 are disposed on the top and bottom of the second connector 9. Swivel adjustment screws 14 separately pass through the adjusting holes 13 to connect the first connector 10 with the second connector 9. Loosening or tightening the swivel adjustment screws 14 can be used to relatively adjust the swivel angles of the first connector 10 relative to the second connector 9 thereby adjusting the swivel angle of the display mounted thereto.

The second connector 9 can be provided with four slotted holes 16, and corresponding mounting holes can be provided on the side of the fixture 19. In this example, adjusting two tilt adjustment screws 15 to connect the second connector 9 and the fixture 19 (e.g., loosening or tightening the two adjustment screws) relatively adjust the tilt angles of the second connector 9 relative to the fixture 19, thereby adjusting the tilt angle of the display. In some embodiments, the side surfaces of the first connector 10 can be provided with two notches for freely swiveling and tilting.

The first connector can be provided with a flange plate 11. A plurality of mounting holes 12 can be provided longitudinally disposed on the mounting component 12. The flange plate 11 can be connected to any of the mounting holes 12 to adjust the mounting height of the display.

The adjustment mechanism 5 can be configured to provide a convenient and adaptive adjustment for a mounted display. For example, the adjustment mechanism 5 can allow the display to swivel right, left, up, and down and for the height thereof to be adjusted.

In FIGS. 1-3, the following reference numerals are used to indicate various components: support component 1, mounting component 2, column 3, base 4, adjustment mechanism 5, first light emitting element 6, control switch 7, fourth light emitting element 8, second connector 9, first connector 10, flange plate 11, notch 12, adjusting hole 13, swivel adjustment screw 14, tilt adjustment screw 15, slotted hole 16, second light emitting element 17, third light emitting element 18, fixture 19, and fifth light emitting element 20.

Figure 4:
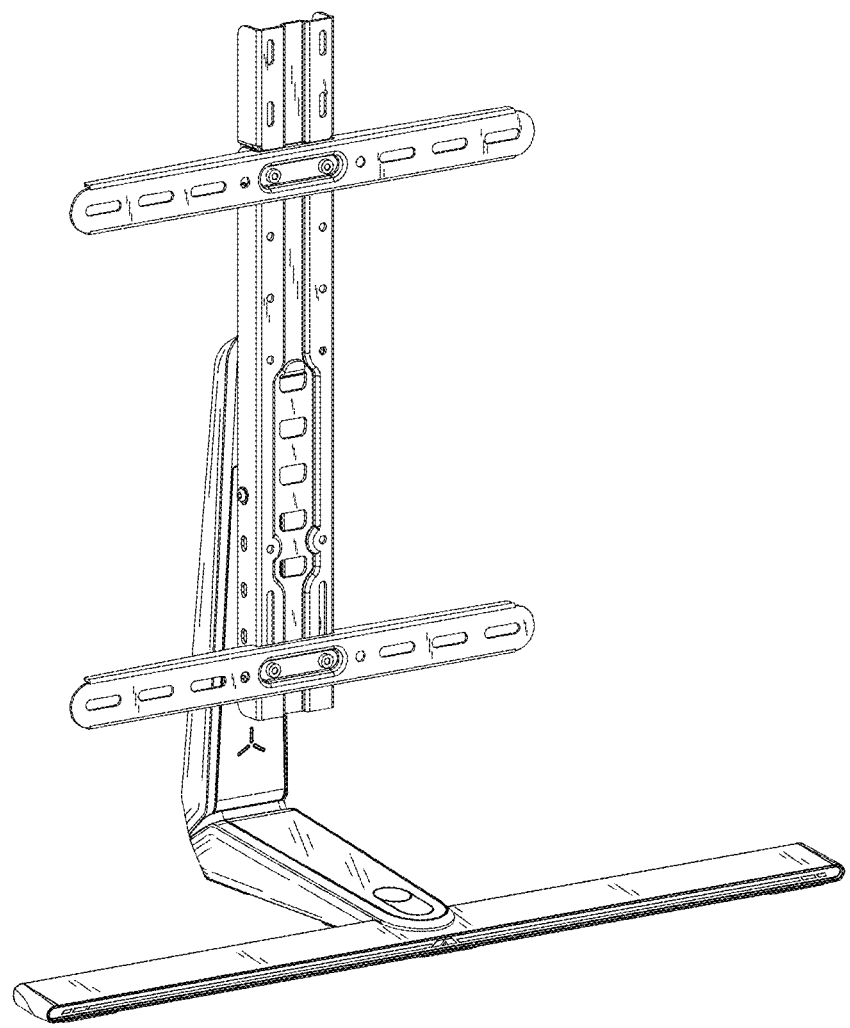
FIGS. 4-11 provide additional views of an embodiment a display mount with decorative lighting. In particular.
Figure 5:
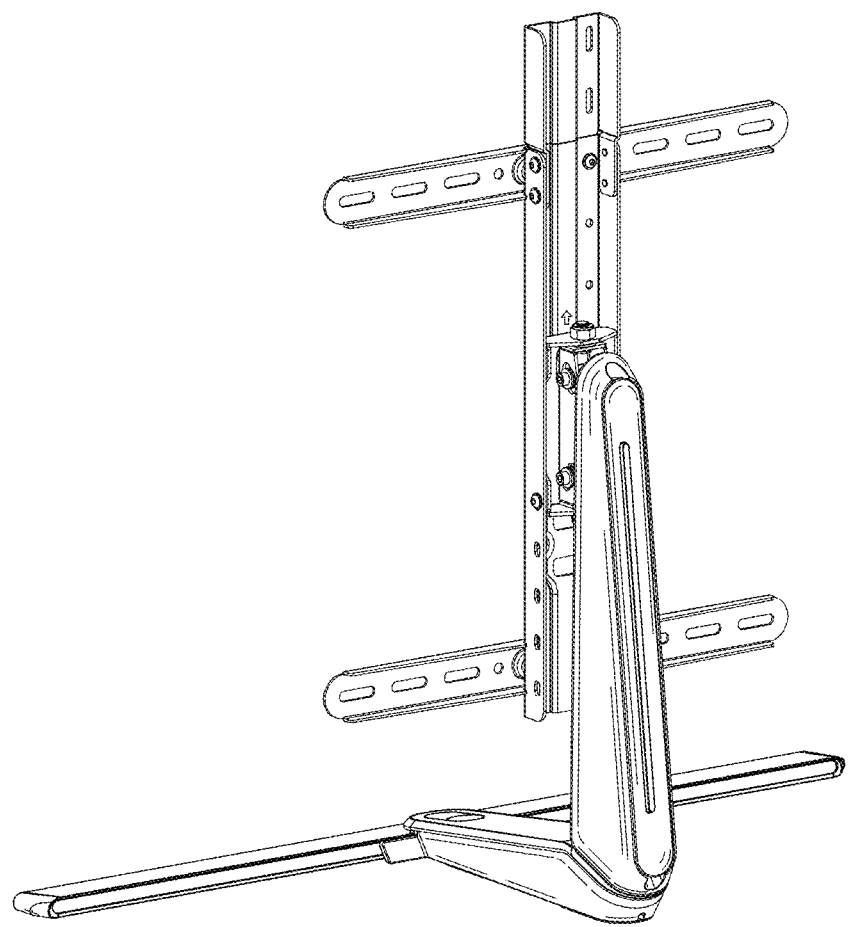
Figure 6:
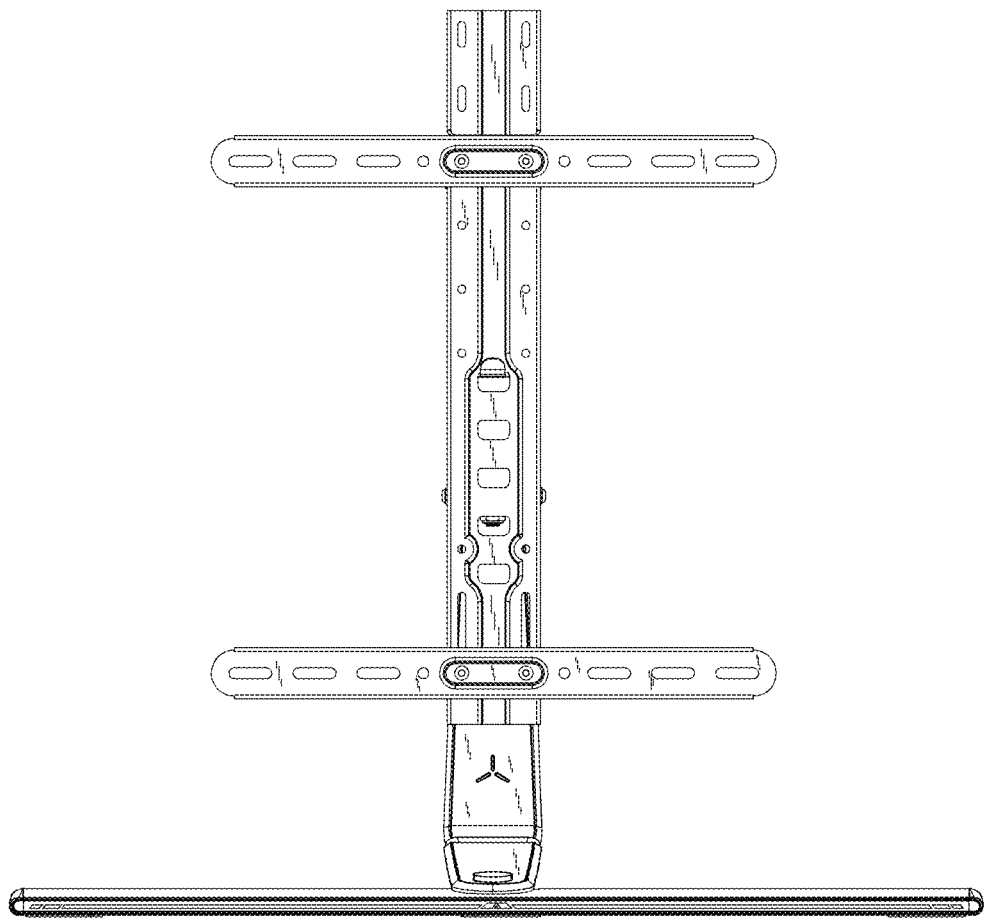
Figure 7:
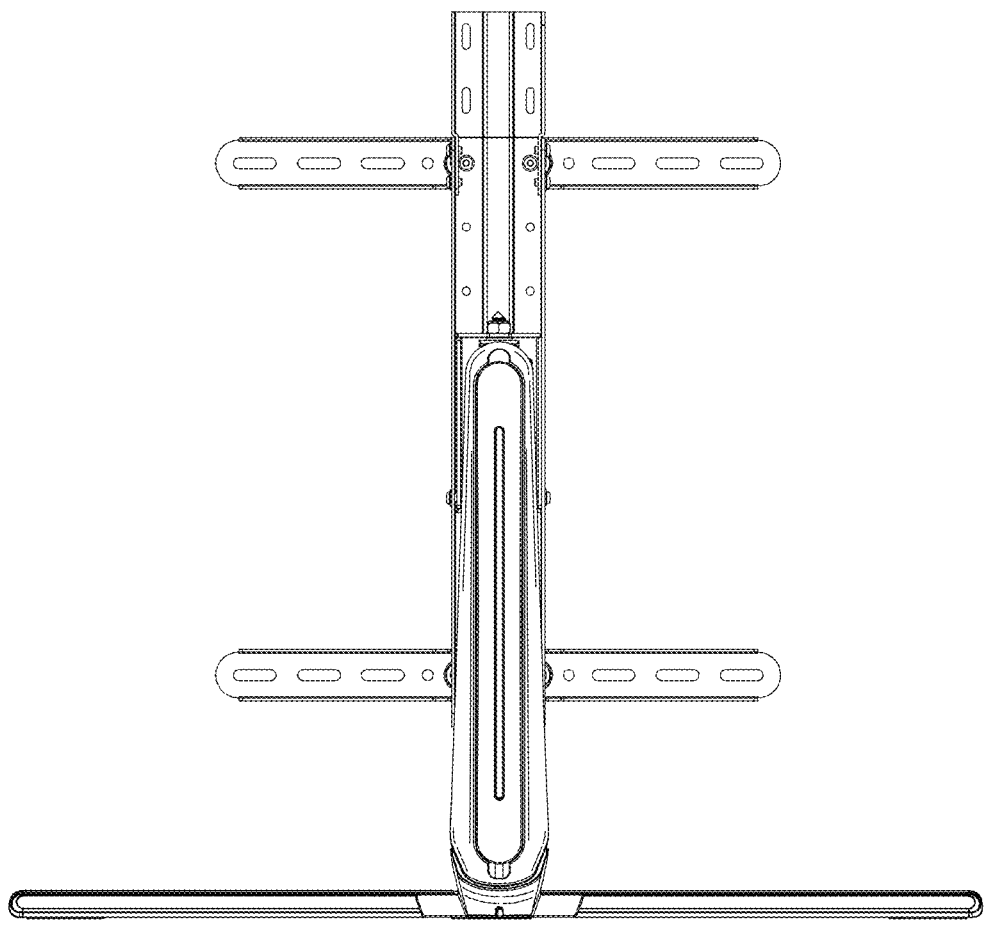
Figure 8:
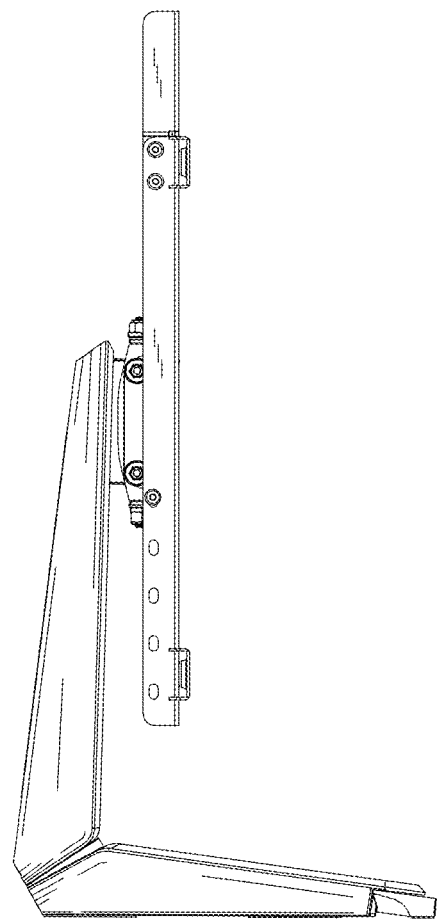
Figure 9:
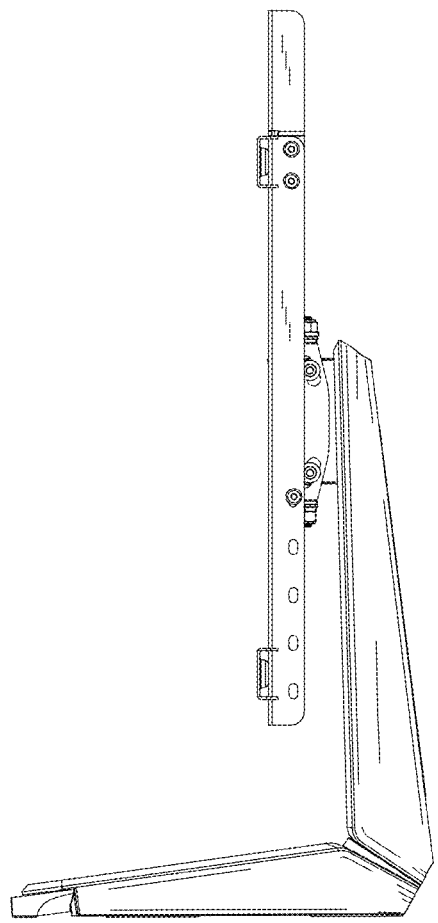
Figure 10:
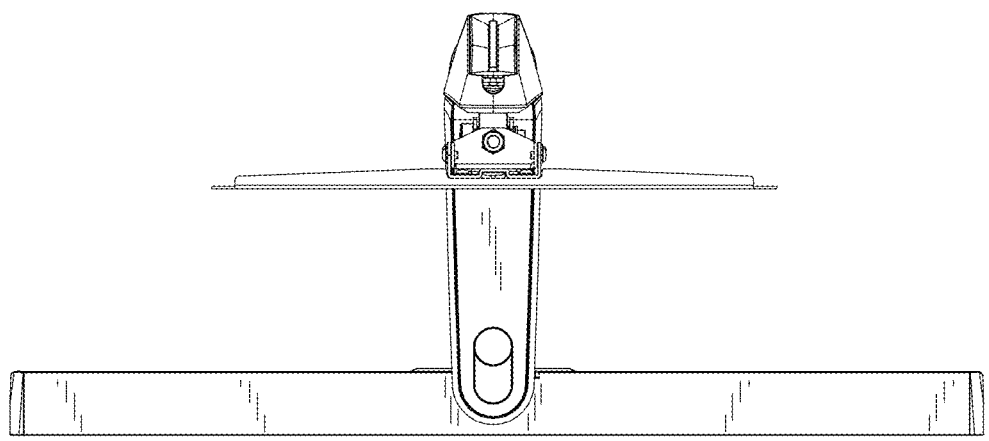
Figure 11:
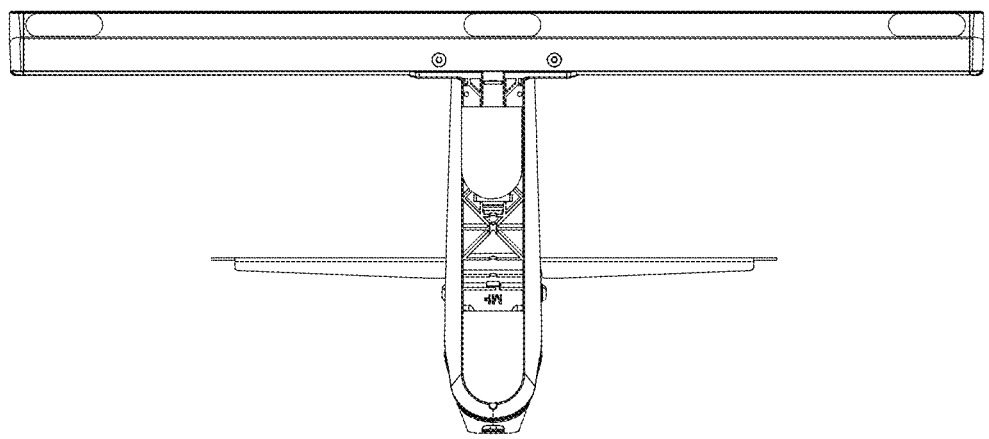

FIGS. 4-11 provide additional views of an embodiment a display mount with decorative lighting. In particular: FIG. 4 is a first perspective view thereof; FIG. 5 is a second perspective view thereof; FIG. 6 is a front view thereof; FIG. 7 is a back view thereof; FIG. 8 is a left side view thereof; FIG. 9 is a right side view thereof; FIG. 10 is a top view thereof; and FIG. 11 is a bottom view thereof.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A display mounting system with integrated decorative lighting, the system comprising:
    a support component, a mounting component and one or more light sources, wherein:
        the mounting component is configured to attach to a display;
        the support component is connected with the mounting component and comprises
            a column coupled to the mounting component,
            a base supporting the column, the base comprising a first support bar and a second support bar, the first end of the second support bar connecting with the first support bar such that the base comprises a T-shape configured to rest on a support surface; and
        at least a first light source of the one or more light sources is located on a rear portion of the first support bar and configured to provide decorative lighting.

2. The system of claim 1, wherein at least one of the one or more light sources are positioned on the column or the base.

3. The system of claim 2, wherein:
    the column has a front side and a rear side opposite the front side;
    the one or more light sources includes at least one first light emitting element or at least one second light emitting element, the at least one first light emitting element disposed on the front side, and the at least one second light emitting element disposed on the rear side.

4. The system of claim 3, wherein that the one or more light sources include a control switch used for controlling the light emitting elements, and the control switch is disposed on a second support bar.

5. The system of claim 3, wherein in that the light emitting elements of the light source comprise one or more lighting strips or LED lights.

6. The system of claim 3, wherein an adjustment mechanism is disposed between the support component and the mounting component, the adjustment mechanism arranged to adjust the swivel, tilt or height of the display.

7. The system of claim 1, wherein the one or more light sources include at least one fifth light emitting element, and the at least one fifth light emitting element is disposed on the mounting component.

8. The system of claim 7, wherein that the one or more light sources include a control switch used for controlling the light emitting elements, and the control switch is disposed on the second support bar.

9. The system of claim 7, wherein in that the light emitting elements of the light source comprise one or more lighting strips or LED lights.

10. The system of claim 7, wherein an adjustment mechanism is disposed between the support component and the mounting component, the adjustment mechanism arranged to adjust the swivel, tilt or height of the display.

11. The system of claim 1, wherein that the one or more light sources include a control switch used for controlling the light emitting elements, and the control switch is disposed on the second support bar.

12. The system of claim 1, wherein in that the light emitting elements of the light source comprise one or more lighting strips or LED lights.

13. The system of claim 1, wherein an adjustment mechanism is disposed between the support component and the mounting component, the adjustment mechanism arranged to adjust the swivel, tilt or height of the display.

\* \* \* \* \*